(12) United States Patent
Yamada (10) Patent No.: US 10,378,151 B2
(45) Date of Patent: Aug. 13, 2019

(54) METHOD OF MANUFACTURING PAPER SHEET

(71) Applicant: Kikuo Yamada, Shinagawa-ku (JP)

(72) Inventor: Kikuo Yamada, Shinagawa-ku (JP)

( * ) Notice: Subject to any disclaimer, the term of this patent is extended or adjusted under 35 U.S.C. 154(b) by 54 days.

(21) Appl. No.: 15/529,851

(22) PCT Filed: Nov. 30, 2015

(86) PCT No.: PCT/JP2015/083562
§ 371 (c)(1),
(2) Date: May 25, 2017

(87) PCT Pub. No.: WO2016/088706
PCT Pub. Date: Jun. 9, 2016

(65) Prior Publication Data
US 2017/0268174 A1    Sep. 21, 2017

(30) Foreign Application Priority Data

Dec. 1, 2014  (JP) ................. 2014-243569

(51) Int. Cl.
| | |
|---|---|
| *B31F 1/07* | (2006.01) |
| *D21F 11/00* | (2006.01) |
| *B32B 29/08* | (2006.01) |
| *D21H 25/04* | (2006.01) |
| *D21F 3/00* | (2006.01) |

(Continued)

(52) U.S. Cl.
CPC .............. *D21F 11/006* (2013.01); *B31F 1/07* (2013.01); *B32B 29/08* (2013.01); *D21F 3/00* (2013.01); *D21H 25/04* (2013.01); *B65H 27/00* (2013.01); *D21F 11/14* (2013.01)

(58) Field of Classification Search
None
See application file for complete search history.

(56) References Cited

U.S. PATENT DOCUMENTS 3,717,532 A  *  2/1973  Kamp ...................... B31F 1/07
                                                         156/199
6,755,928 B1     6/2004  Biagiotti
(Continued)

FOREIGN PATENT DOCUMENTS

| CN | 101873927 A | 10/2010 |
|---|---|---|
| EP | 1 478 506 | 11/2004 |

(Continued)

OTHER PUBLICATIONS

Partial Supplementary European Search Report dated Jun. 15, 2018 in European Patent Application No. 15864479.9, 13 pages.
(Continued)

*Primary Examiner* — Barbara J Musser
(74) *Attorney, Agent, or Firm* — Oblon, McClelland, Maier & Neustadt, L.L.P.

(57) ABSTRACT

A method of manufacturing a paper sheet with improved softness and the paper sheet are provided. A method of manufacturing a paper sheet 101 according to the present invention includes a supply step of supplying a continuous base sheet 1, 1A, or 1B, and a plurality of times of pressing steps of applying, to a surface of the base sheet 1, 1A, or 1B, pressing force having a normal-direction component of the surface.

19 Claims, 9 Drawing Sheets

(51) Int. Cl.
*B65H 27/00* (2006.01)
*D21F 11/14* (2006.01)

(56) References Cited

U.S. PATENT DOCUMENTS

| | | | |
|---|---|---|---|
| 2001/0008179 A1* | 7/2001 | Oriarian | B31F 1/07 162/109 |
| 2003/0021953 A1* | 1/2003 | Graff | B31F 1/07 428/153 |
| 2004/0038006 A1* | 2/2004 | Biagiotti | B31F 1/07 428/172 |
| 2004/0247836 A1 | 12/2004 | Biagiotti | |
| 2010/0295213 A1 | 11/2010 | McNeil | |
| 2010/0295214 A1 | 11/2010 | Boatman et al. | |
| 2015/0090414 A1 | 4/2015 | Yamada | |

FOREIGN PATENT DOCUMENTS

| | | |
|---|---|---|
| JP | 49-47674 A | 5/1974 |
| JP | 7-213552 A | 8/1995 |
| JP | 7-268800 A | 10/1995 |
| JP | 2002-501127 A | 1/2002 |
| JP | 2002-501129 A | 1/2002 |
| JP | 2005-87527 A | 4/2005 |
| JP | 2012-40775 A | 3/2012 |
| JP | 2013-249573 A | 12/2013 |
| JP | 2014-104261 A | 6/2014 |
| WO | WO 99/37839 A1 | 7/1999 |
| WO | WO 99/37841 A1 | 7/1999 |
| WO | WO 03/072344 A1 | 9/2003 |
| WO | WO 2014/181389 A1 | 11/2014 |
| WO | WO 2015/182784 A1 | 12/2015 |

OTHER PUBLICATIONS

International Search Report issued Feb. 16, 2016 in PCT/JP2015/083562 filed Nov. 30, 2015.

* cited by examiner

FIG. 9

METHOD OF MANUFACTURING PAPER SHEET

TECHNICAL FIELD

The present invention relates to a method of manufacturing a paper sheet and a paper sheet.

BACKGROUND ART

Conventionally, surfaces of paper sheets such as a sheet for cleaning toilet and a sheet for cleaning kitchen are embossed in order to improve wiping effects and touch.

However, in a case of paper sheets that are used while being in direct contact with human bodies, further softness (e.g., lightness, smoothness, and flexibility) is desired.

Therefore, there is a conventional technique for embossing the paper sheets in particular size with a view to improving softness (refer to Patent Literature 1).

CITATION LIST

Patent Literature

Patent Literature 1: JP 7-268800 A

SUMMARY OF INVENTION

Technical Problem

An object of the present invention is to provide a method of manufacturing a paper sheet with improved softness, and the paper sheet.

Solution to Problem

The present invention solves the above-described problem by the solution to problem below.

The invention according to claim 1 is a method of manufacturing a paper sheet, including: a supply step of supplying a continuous base sheet; and a plurality of times of pressing steps of applying, to a surface of the base sheet, pressing force having a normal-direction component of the surface.

The invention according to claim 2 is the method of manufacturing a paper sheet according to claim 1, wherein the pressing step includes a step of interposing the base sheet between two members facing each other to press the base sheet.

The invention according to claim 3 is the method of manufacturing a paper sheet according to claim 2, wherein the pressing step includes a step of using, as at least one of the two members, a member having a flat facing surface facing the other member.

The invention according to claim 4 is the method of manufacturing a paper sheet according to claim 1, wherein the pressing step includes an unevenness forming step of using, as at least one of the two members, a member having a facing surface on which a raised portion is formed, the facing surface facing the other member.

The invention according to claim 5 is the method of manufacturing a paper sheet according to claim 1, wherein the pressing step is performed in a state where the base sheet is dry.

The invention according to claim 6 is the method of manufacturing a paper sheet according to claim 1, further including: a binder supply step of supplying a binder to the paper sheet.

The invention according to claim 7 is the method of manufacturing a paper sheet according to claim 6, further including: a drying step after the binder supply step.

The invention according to claim 8 is the method of manufacturing a paper sheet according to claim 7, wherein at least one of the pressing steps is performed after the drying step.

The invention according to claim 9 is the method of manufacturing a paper sheet according to claim 8, wherein the pressing step includes: a longitudinal unevenness forming step of forming a raised portion and a recessed portion in the base sheet in a direction extending in a longitudinal direction thereof; and a lateral unevenness forming step of forming a raised portion and a recessed portion in the base sheet in a direction extending in a short-side direction thereof, the longitudinal unevenness forming step and the lateral unevenness forming step being performed after the drying step.

The invention according to claim 10 is the method of manufacturing a paper sheet according to claim 1, wherein the supply step supplies the base sheets from two directions, the method of manufacturing a paper sheet further including: a softness imparting material supply step of supplying a softness imparting material, and supplying the softness imparting material to between the base sheets supplied from the two directions.

The invention according to claim 11 is the method of manufacturing a paper sheet according to claim 1, further including: a softness imparting material supply step of supplying a softness imparting material from an upper side of the base sheet; and an adsorbing step of adsorbing the softness imparting material from a lower side of the base sheet.

The invention according to claim 12 is the method of manufacturing a paper sheet according to claim 1, wherein the pressing force of the plurality of times is applied by pressing members having a same shape.

The invention according to claim 13 is the method of manufacturing a paper sheet according to claim 1, wherein the pressing force of the plurality of times is applied using different pressing members.

The invention according to claim 14 is the method of manufacturing a paper sheet according to claim 1, further including: a heating step of heating the base sheet.

The invention according to claim 15 is a paper sheet manufactured by the method of manufacturing a paper sheet according to claim 1.

Note that the above-described configuration may be appropriately modified, and at least a part of the configuration may be replaced with another element.

Advantageous Effects of Invention

According to the present invention, a method of manufacturing a paper sheet with improved softness and the paper sheet can be provided.

DESCRIPTION OF EMBODIMENTS

First Embodiment

Figure 1:
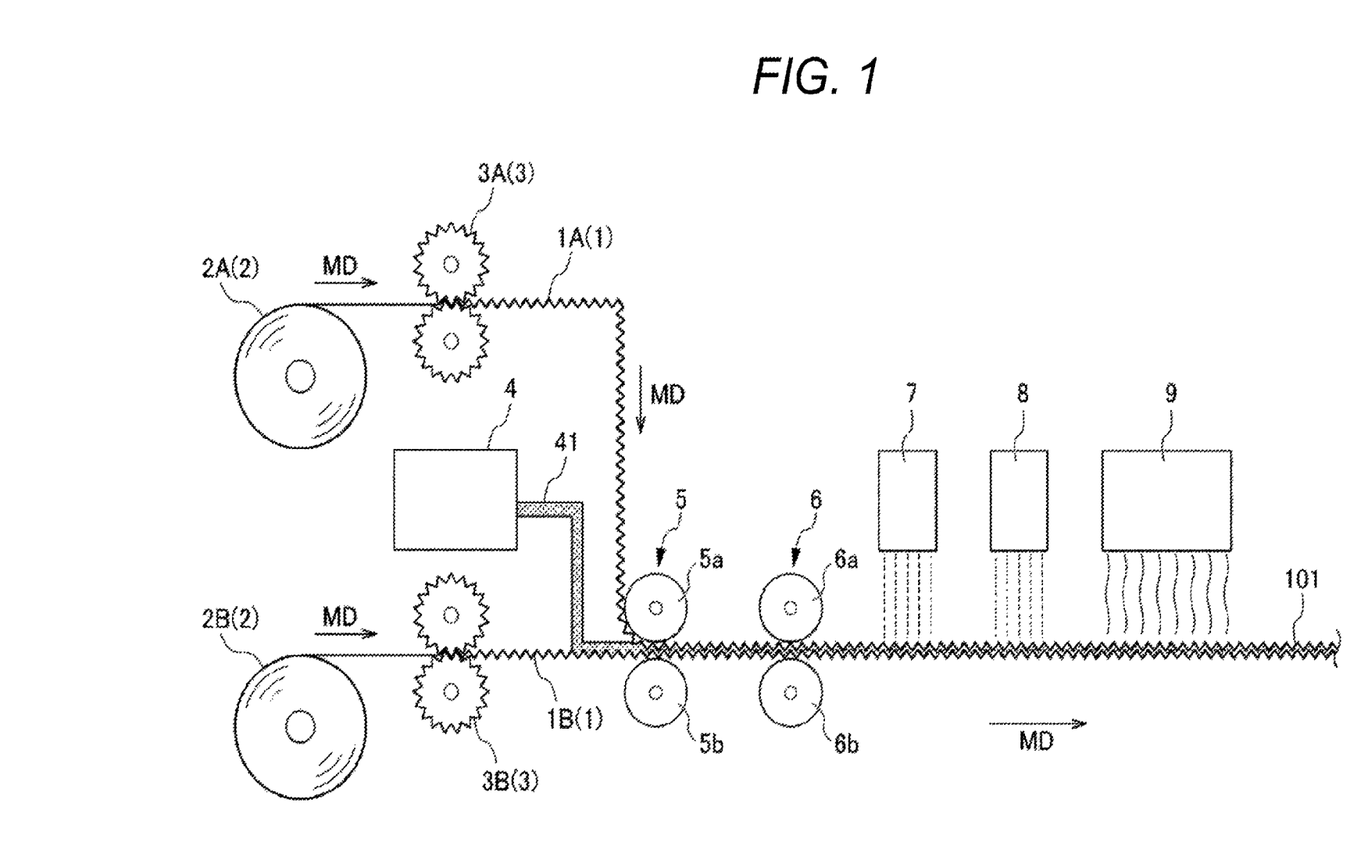
FIG. 1 is a diagram illustrating a method of manufacturing a paper sheet of the present embodiment.

Hereinafter, a first embodiment of the present invention will be described on the basis of the drawings. FIG. 1 is a diagram illustrating a method of manufacturing a paper sheet 101 of the present embodiment.

The method of manufacturing the paper sheet 101 of the present embodiment is a method of applying processing by a plurality of steps, to base sheets 1 (1A and 1B) or in a state where a softness imparting material 41 is interposed between the base sheets 1A and 1B, to manufacture the soft paper sheet 101.

The soft paper sheet 101 of the present embodiment can be used for, for example, cleaning supplies for cleaning a toilet bowl in a toilet and around the toilet, baby wipes, body wipes for wiping a body, facial wipes for wiping a face, makeup removers, facial masks, pre-moistened tissues, pre-moistened wipes, paper dusters, and pre-moistened floor wipes.

Furthermore, the soft paper sheet 101 of the present embodiment can be used as a raw material of dry products such as tissue paper used in a non-wet state. In this case, the soft paper sheet 101 has good water absorbency, and thus can also be used as a raw material of pre-moistened products such as cleaning supplies for toilet and around, baby wipes, body wipes for wiping a body, facial wipes for wiping a face, makeup removers, facial masks, pre-moistened tissues, pre-moistened wipes, paper dusters, or pre-moistened floor wipes, where these products are impregnated with, for example, an antimicrobial agent, a washing agent, or a cleaning agent.

Furthermore, the soft paper sheet 101 of the present embodiment can be used for absorbent articles such as diapers, sanitary napkins, or incontinence pads, and for absorbent articles such as disposable clothing, diapers, disposable sanitary napkins, or incontinence pads.

(Material of Base Sheet)

As the base sheet 1, a paper material having liquid permeability and formed of pulp paper or a material containing pulp as a main raw material is used.

In the case where the base sheet 1 is formed of the material containing pulp as a main raw material, the percent composition of pulp is preferably 30% or more. Furthermore, the percent composition of pulp is more preferably 50% or more. The percent composition of pulp is still more preferably 80% or more.

By setting the percent composition of pulp to the above-described percentage, softness of the paper sheet 101 can be improved, and production efficiency at the time of manufacturing can be improved.

Furthermore, by setting the percent composition of pulp to be high, the disposed paper sheet 101 can be easily decomposed in the earth after disposal of the paper sheet 101, for example. Therefore, environmental burdens can be reduced, and concerns for the environment can be improved.

Note that, as the base sheets 1A and 1B, the same material having the same thickness may be used or different materials may be used.

As pulp in the case where the base sheet 1 is formed of the material containing pulp as a main raw material, various types of base pulp can be used.

Examples of the base pulp usable in the present embodiment include wood pulp, synthetic pulp, and waste paper pulp.

Furthermore, the base pulp is not limited to natural fibers such as pulp, and regenerated fibers such as rayon can also be used. Note that, in a case where the base sheet 1 is formed of the material containing pulp as a main raw material, a synthetic fiber may be included as another material.

Furthermore, in the present embodiment, a toilet paper material can be used as the base pulp.

In this case, the base pulp composed of predetermined ratios of softwood bleached kraft pulp and hardwood bleached kraft pulp can be used, the softwood bleached kraft pulp being obtained from softwood such as red pine, Yezo spruce, Sakhalin fir, Douglas fir, hemlock, and spruce, the hardwood bleached kraft pulp being obtained from hardwood such as beech, Japanese oak, birch, *eucalyptus*, oak, poplar, and alder.

Furthermore, as a material of the base sheet 1 in the present embodiment, a natural fiber is preferably used. As the natural fiber, for example, kenaf, bamboo fiber, straw, cotton, cocoon filament, or sugarcane can be used.

Note that a paper material used as the base sheet 1 may be a paper material having water-dispersibility or may be a paper material not having water-dispersibility. Furthermore, the paper material used as the base sheets 1A and 1B is not limited to the above-described examples.

(Method of Manufacturing Base Sheet)

An example of a method of manufacturing the base sheet 1, to which a processing method of the present embodiment is applied, includes, but is not limited to, a wet paper making method of dispersing fiber of several millimeters into water and making a sheet with wire netting.

Furthermore, the base sheet 1 may be manufactured by a spunlace method. The spunlace method is also called water flow interlacing method, and is a method of fixing fibers by performing guarding on short fibers to make a web, injecting a jet water flow on the web, and causing the fibers to be entangled by water pressure to combine the fibers into a sheet shape.

(Softness Imparting Material)

The softness imparting material 41 is layered between the base sheets 1A and 1B.

The softness imparting material 41 is formed of crushed pulp or a material containing crushed pulp as a main raw material. The crushed pulp refers to cotton-like pulp obtained by finely crushing a pulp material that serves as a base of the paper material by a crusher, for example.

The crushed pulp is manufactured by, for example, crushing a pulp sheet serving as a base by a crusher.

Various pulp materials can be used as the material of the pulp sheet.

Examples of the pulp material include wood pulp, synthetic pulp, and waste paper pulp.

Furthermore, the pulp material is not limited to natural fibers such as pulp, and regenerated fibers such as rayon can also be used.

Furthermore, in the present embodiment, a toilet paper material can be used as the pulp sheet serving as a base.

In this case, the base pulp composed of softwood bleached kraft pulp and hardwood bleached kraft pulp can be used, the softwood bleached kraft pulp being obtained from softwood such as red pine, Yezo spruce, Sakhalin fir, Douglas fir, hemlock, and spruce, the hardwood bleached kraft pulp being obtained from hardwood such as beech, Japanese oak, birch, *eucalyptus*, oak, poplar, and alder. However, the base pulp made of softwood bleached kraft pulp is preferably used from the standpoint of manufacturing.

Furthermore, as a material of the pulp sheet serving as a base, a natural fiber is preferably used. As the natural fiber, for example, kenaf, bamboo fiber, straw, cotton, cocoon filament, or sugarcane can be used.

Note that the material of the pulp material used in forming the softness imparting material 41 may be different from the material that forms the base sheet 1, or may be the same.

In a case where the material to be used for the softness imparting material 41 is formed of the material containing the crushed pulp as a main raw material, the percent composition of the crushed pulp is preferably 30% or more, and the percent composition of the crushed pulp is more preferably 50% or more.

Still more desirably, the percent composition of the crushed pulp is preferably 80% or more.

Since the crushed pulp is formed by crushing the pulp material into a state of cotton, a space can be more easily formed between fibers that form the crushed pulp by setting the percent composition of the crushed pulp to the above percentage.

Note that, in a case where the softness imparting material is formed of the material containing the crushed pulp as a main raw material, a synthetic fiber may be included as another material.

Since an infinite number of spaces are formed between fibers, the bulkiness of the softness imparting material 41 can be made larger with a smaller weight per area by the formed spaces, and the softness imparting material 41 can be configured to have a higher bulkiness forming function.

Furthermore, by forming the softness imparting material 41 from the material containing the crushed pulp as a main raw material in this way, the space between fibers is formed and the degree of freedom of movement of the fibers can be made large, and also the bulkiness of the softness imparting material 41 can be made large. Therefore, softness of the paper sheet 1 as a whole can be improved, and the production efficiency at the time of manufacturing can be improved.

Here, the bulkiness forming function is a function to further increase the bulkiness of the paper sheet 101 in which the base sheet 1 and the softness imparting material 41 are layered. A case where the bulkiness forming function is high means a state in which the bulkiness of the paper sheet 101 is large, and a case where the bulkiness forming function is low means a state in which the bulkiness of the paper sheet 101 is small.

Note that the weight per area of the crushed pulp in the softness imparting material 41 is preferably 80 g/m$^2$ or less, and more preferably 60 g/m$^2$ or less. By setting the weight per area of the crushed pulp to fall within the above-described range, the paper sheet 101 can be easily manufactured and packed, and can be configured to have the bulkiness that allows users to easily use and pack the paper sheet.

If the bulkiness is adjusted in this way, a large quantity of binder is not necessary. Therefore, it is possible to prevent a large quantity of binder from adhering to a surface of the paper sheet 101, and the adhering binder from being turned into a film, and general softness of the paper sheet 101 can be secured.

Furthermore, as described above, the softness imparting material 41 is configured from a large number of fibers, and to have different densities of fibers in a thickness direction. To be specific, a vacuum device (not illustrated) that can adsorb a base sheet 1B from below by vacuum is provided between a first pressure roll 3B and a pinch roll 5. Accordingly, in the paper sheet 101 according to the present embodiment, while fibers are dense because of strong vacuum adsorbing force on the side of the base sheet 1B, fibers become sparse toward the base sheet 1A away from the base sheet 1B. As a result, in products that come in direct contact with human skin, if the side of the base sheet 1A is touched by human skin, the texture is pleasant because of the sparse fibers. As for cleaning supplies for table and toilet seat, if the table and the toilet seat are wiped with the side of the base sheet 1B, cleaning performance can be improved because of the dense fibers.

According to the method of manufacturing the paper sheet 101 of the present embodiment, the paper sheet 101 is supplied with supply rolls 2A and 2B around which the base sheets 1A and 1B are respectively wound, the base sheets 1A and 1B being manufactured by the wet paper making method or the spunlace method as described above, for example.

Furthermore, the paper sheet 101 is processed by a softness imparting material supply device 4 that supplies the softness imparting material 41 to be interposed between the base sheets 1A and 1B, a first pressure roll 3, the pinch roll 5, a second pressure roll 6, a binder supply device 7, a crosslinking agent supply device 8, and a drying device 9.

(Supply Roll)

The supply roll 2 is provided with two supply rolls 2A and 2B, and the base sheets 1A and 1B are respectively wound around the supply rolls 2A and 2B. The base sheets 1A and 1B processed with the supply rolls 2A and 2B are pulled out downstream in the illustrated machine direction (MD).

(First Pressure Roll)

The first pressure roll 3 is arranged downstream in the MD of the supply roll 2.

The first pressure roll 3 is provided with two first pressure rolls 3A and 3B; the first pressure roll 3 is arranged downstream in the MD of the supply roll 2A, and the first pressure roll 3B is arranged downstream in the MD of the supply roll 2B.

Figure 2:
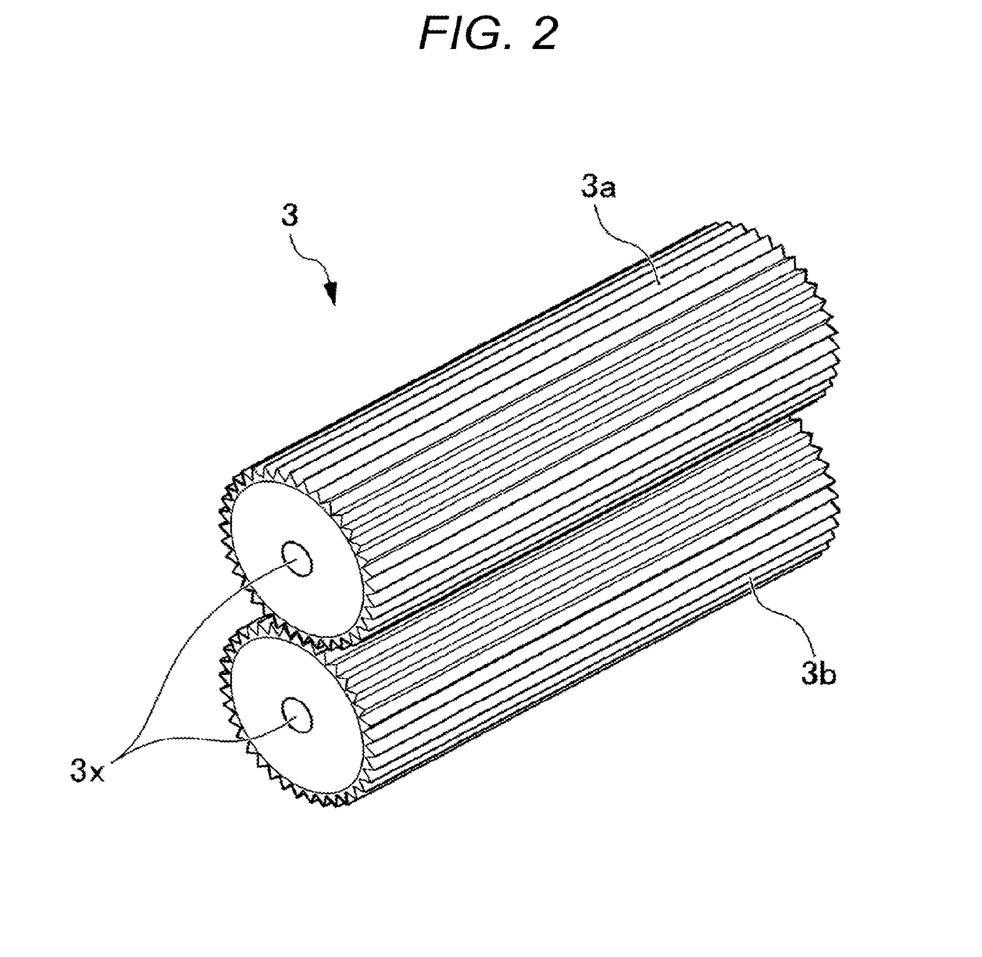
FIG. 2 is a view illustrating first pressure rolls.

FIG. 2 is a view illustrating the first pressure roll 3. Note that the first pressure rolls 3A and 3B have a similar structure, and thus they are collectively described as the first pressure roll 3.

Note that "unevenness" used in the present specification refers not only to a case where recessed portions and raised portions are formed at approximately similar intervals, as illustrated in FIG. 2, but also to a case where the raised portions are formed on a flat portion, or a case where the recessed portions are formed in a flat portion.

The first pressure roll 3 has a pair of upper and lower rolls 3a and 3b facing each other. The rolls 3a and 3b each have a columnar shape, and are rotatable around axial lines 3x.

The first pressure roll 3 is a roll that forms unevenness (embosses) in the base sheet 1 in a direction perpendicular to the MD direction. That is, as illustrated in FIG. 2, a surface of the roll 3a is provided with a plurality of unevenness extending along the axial line 3x of the roll 3a. Furthermore, the roll 3b is provided with unevenness to be meshed with the unevenness of the roll 3a.

Figure 3:
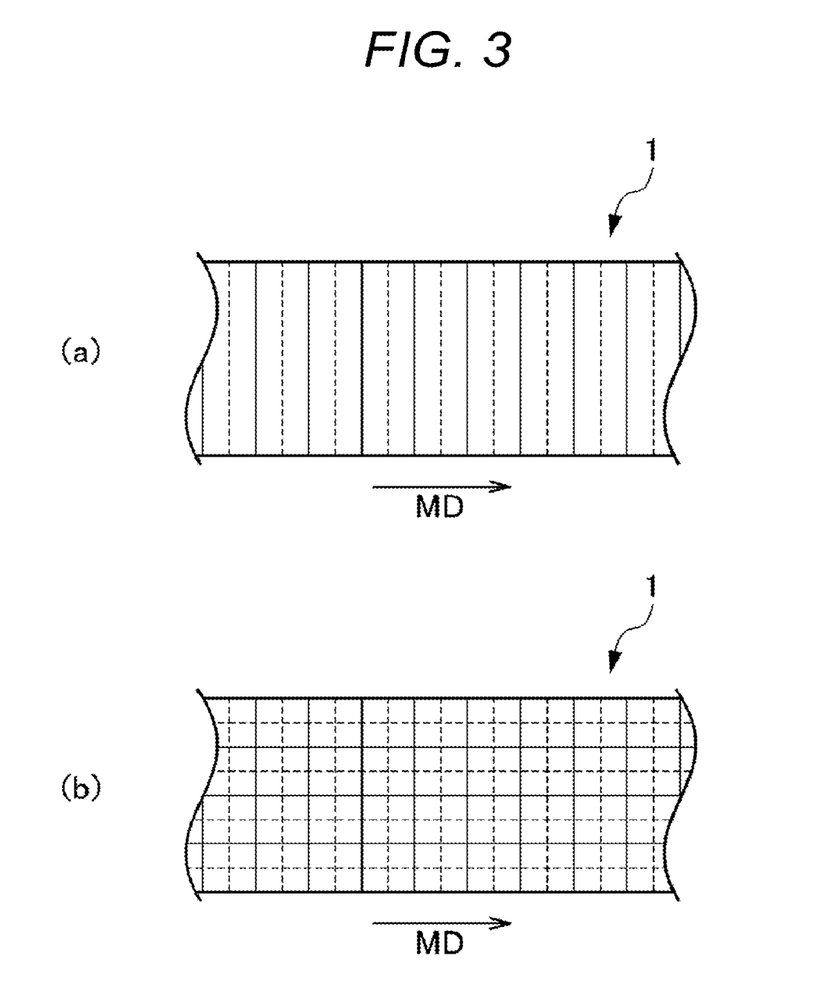
FIG. 3(a) is a view illustrating a state of a base sheet after passing between first pressure rolls.
FIG. 3(b) is a view illustrating a state of the paper sheet after passing between second pressure rolls.

FIG. 3(a) is a view illustrating a state of the base sheet 1 after passing between the roll 3a and the roll 3b. The straight lines in FIG. 3(a) represent peak lines (raised portions), and the dotted lines represent bottom lines (recessed portions). As illustrated in FIG. 3(a), linear embosses extending in a lateral direction (a direction perpendicular to the MD, or a short-side direction) are formed on the base sheet 1 after passing between the roll 3a and the roll 3b. That is, the rolls 3a and 3b impart pressing force having a normal-direction component to the surface of the base sheet 1 formed in the MD direction and in the short-side direction, thereby to emboss the base sheet 1.

Hereinafter, in the present specification, the linear emboss formed on the sheet (the base sheet 1 or the paper sheet 101) refers to a shape having the peak line (raised portion) and the bottom line (recessed portion). Furthermore, on the basis of an intermediate height between a highest portion and a lowest portion in a sheet, a portion higher than the intermediate height is defined as the peak line and a portion lower than the intermediate height is defined as the bottom line.

(Softness Imparting Material Supply Device)

The softness imparting material supply device 4 is a device that supplies the softness imparting material 41 to the base sheet 1. In the present embodiment, the softness imparting material 41 is arranged on the base sheet 1B supplied from the supply roll 2B and conveyed along the MD.

(Pinch Roll)

The pinch roll 5 is arranged downstream in the MD of the first pressure rolls 3A and 3B.

The pinch roll 5 includes a pair of rolls 5a and 5b facing each other. The rolls 5a and 5b each have a columnar shape, and are rotatable around axial lines. The pair of rolls 5a and 5b imparts pressing force having a normal-direction component to the surface of the base sheet 1, and thus the base sheet 1A, and the base sheet 1B layered with the softness imparting material 41 are layered. The paper sheet 101 as a layered body of the base sheet 1A, the softness imparting material 41, and the base sheet 1B having passed through the pinch roll 5 is further sent to the downstream in the MD.

(Second Pressure Roll)

The second pressure roll 6 that further embosses the paper sheet 101 is arranged downstream in the MD of the pinch roll 5.

The second pressure roll 6 has rolls 6a and 6b having columnar shapes, and unevenness for embossing is formed in surfaces of the rolls 6a and 6b, similarly to the first pressure rolls 3A and 3B.

Figure 4:
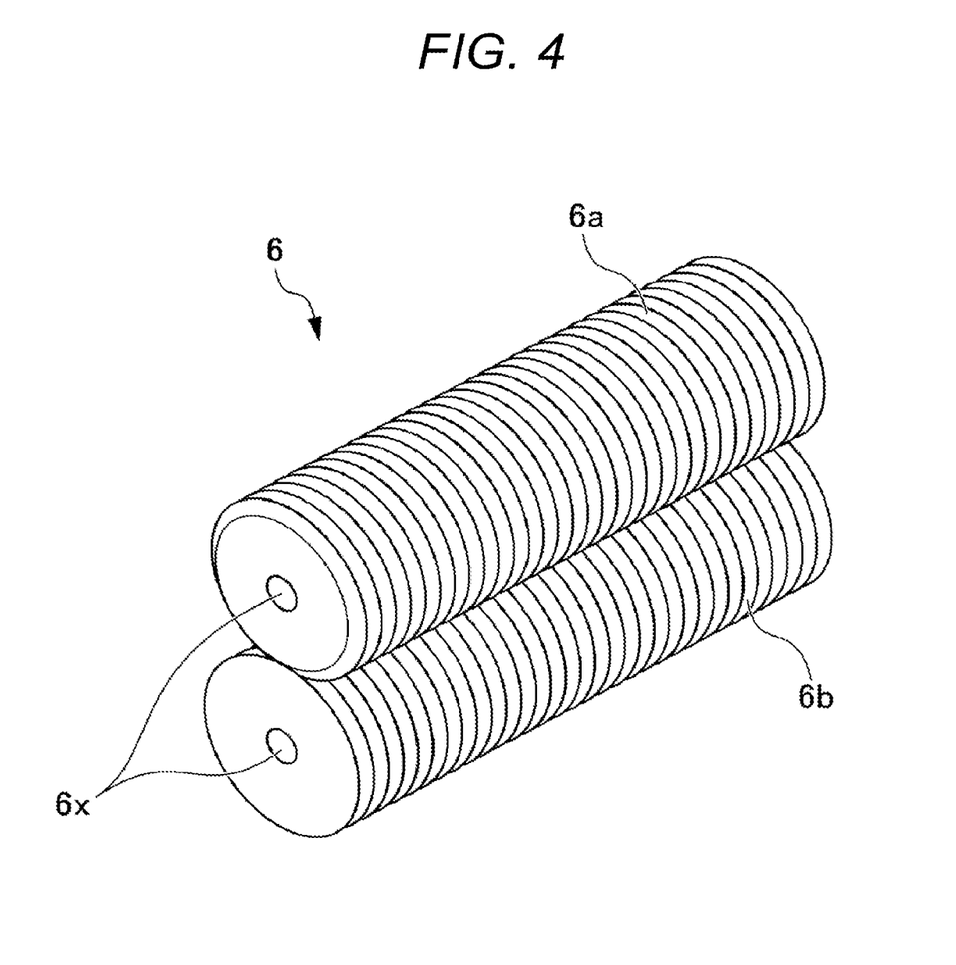
FIG. 4 is a view illustrating the second pressure rolls.

In the present embodiment, the second pressure roll 6 is a roll that linearly embosses the paper sheet 101 in the MD direction, unlike the first pressure roll 3. That is, as illustrated in FIG. 4, the surface of the roll 6a is provided with a plurality of unevenness extending along a peripheral direction around an axial line 6x. Furthermore, the roll 6b is provided with unevenness to be meshed with the unevenness of the roll 6a. Furthermore, as is clear from FIG. 4, the pair of rolls 6a and 6b faces each other, and imparts pressing force having a normal-direction component to the surface of the base sheet 1.

When the paper sheet 101 is embossed by the second pressure roll 6, the emboss in a longitudinal direction (the MD) is formed on the emboss in the lateral direction formed by the first pressure roll 3. Therefore, the embosses form a grid-like shape, as illustrated in FIG. 3(b). Note that, also in FIG. 3(b), the linear lines represent the peak lines (raised portions) and the dotted lines represent the bottom lines (recessed portions), similarly to FIG. 3(a).

Note that, in the present embodiment, the first pressure roll 3 is the roll for forming the lateral emboss, and the second pressure roll 6 is the roll for forming the longitudinal emboss. However, an embodiment is not limited thereto.

For example, the first pressure roll 3 may be a roll for forming the longitudinal emboss, and the second pressure roll 6 may be a roll for forming the lateral emboss. By forming the embosses in two different directions, softness in two different directions can be imparted to the base sheet 1.

Furthermore, both the first pressure roll 3 and the second pressure roll 6 may be rolls for forming embosses in the longitudinal or lateral same direction. In this case, by forming the embosses in the same direction (for example, the lateral direction), softness can be further imparted to the base sheet 1 in the lateral direction. In the case of forming the embosses in the same direction, the first pressure roll 3 and the second pressure roll 6 may form embosses having the same shape, or may form embosses that are different in at least one of the size, shape, and pitch. Note that it would not matter if the base sheet 1 gets local holes by passing through the first pressure roll 3 and the second pressure roll 6, because in that case the base sheet 1 gets more easily impregnated with a binder described below.

FIGS. 5(a) to 5(d) are views illustrating variations of the embosses to be formed.

Figure 5:
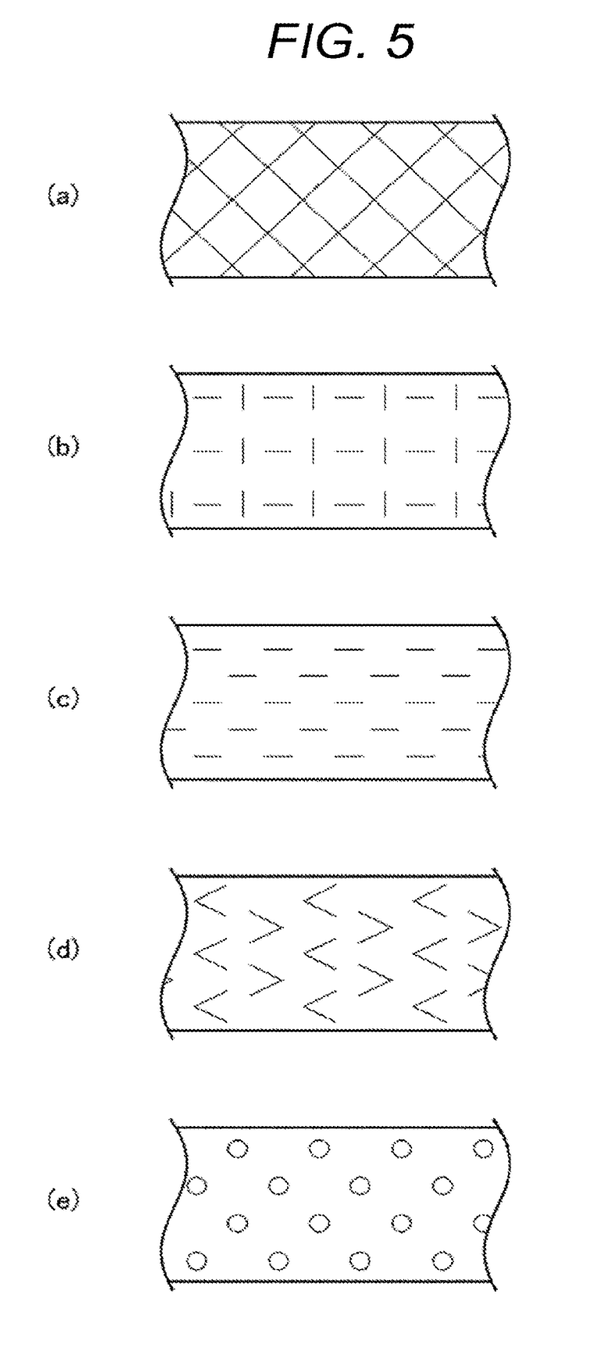
FIGS. 5(a) to 5(e) are views illustrating variations of embosses.

As illustrated in FIG. 5(a), the first pressure roll 3 and the second pressure roll 6 may be rolls for forming embosses diagonal to the MD direction.

Furthermore, the embosses formed by the first pressure roll 3 and the second pressure roll 6 may not be the continuous straight lines.

As illustrated in FIG. 5(b), the embosses formed by the first pressure roll 3 and the second pressure roll 6 extend in directions perpendicular to each other but may be intermittent.

As illustrated in FIG. 5(c), the embosses formed by the first pressure roll 3 and the second pressure roll 6 extend in directions parallel to each other but may be intermittent.

As illustrated in FIG. 5(d), the embosses formed by the first pressure roll 3 and the second pressure roll 6 may form dogleg shapes (inequality signs).

As illustrated in FIG. 5(e), the embosses formed by the first pressure roll 3 and the second pressure roll 6 may form dot shapes.

Furthermore, embossing can be performed without heating the first pressure roll 3 or the second pressure roll 6. However, embossing may be performed in a state where the first pressure roll 3 or the second pressure roll 6 is heated to a predetermined temperature.

In the latter case, a heating temperature of the first pressure roll 3 or the second pressure roll 6 is preferably 60° C. to 150° C. Note that the first pressure roll 3 or the second pressure roll 6 may be heated in accordance with the temperature of the binder sprayed on the paper sheet 101. In this case, the heating temperature of the first pressure roll 3 or the second pressure roll 6 may be the same as the temperature of the binder, or may be higher than the temperature of the binder. As a result, the paper sheet 101 can be more easily impregnated with the binder sprayed on the paper sheet 101, and the amount of spray of the binder can be decreased. Note that the second pressure roll 6 positioned in front of the binder supply device 7 may be heated and heating of the first pressure roll 3 may be omitted, or the pinch roll 5 may be heated. In any case, both of the pair of rolls may be heated, or one of the rolls may be heated and heating of the other roll may be omitted.

(Binder Supply Device)

The binder supply device 7 is arranged downstream in the MD of the second pressure roll 6. The binder supply device 7 is a device that sprays a water-soluble binder on the surface of the paper sheet 101 to impregnate the paper sheet 101 with the water-soluble binder.

Various types of binders can be used as long as the binder has predetermined adhesive strength, and can impart predetermined strength to a surface sheet layer 5 and a softness imparting layer 6. Examples of the binder usable in the present embodiment include a polysaccharide derivative, natural polysaccharides, and a synthetic polymer. Examples of the polysaccharide derivative include carboxymethylcellulose, carboxyethylcellulose, carboxymethylated starch or its salt, starches, methylcellulose, and ethylcellulose. Examples of the natural polysaccharides include guar gum, trant gum, xanthan gum, sodium alginate, carrageenan, gum Arabic, gelatin, and casein. Examples of the synthetic polymer include polyvinyl alcohol, an ethylene-vinyl acetate copolymer resin, a polyvinyl alcohol derivative, and an unsaturated carboxylic acid polymer or copolymer and its salt. Examples of the unsaturated carboxylic acid include acrylic acid, methacrylic acid, maleic anhydride, maleic acid, and fumaric acid. Among the above-described examples, carboxymethylcellulose and polyvinyl alcohol are especially preferable.

The binder supply device 7 is a device that sprays the water-soluble binder on the surface of the paper sheet 101 through a nozzle.

Through the supply of the water-soluble binder, the fibers of the paper sheet 101 are bound through the water-soluble binder, and the binding among the fibers becomes strong.

That is, when the water-soluble binder is dried and turned into a film, the strength of the binder film is larger than the strength of the fiber, and the strength of the paper sheet 101 (a water-dispersible paper and a non-water-dispersible paper) is increased.

Note that an addition time of the binder is arbitrary. That is, the base sheet 1 may be impregnated with the binder/crosslinking agent before being embossed. The paper sheet 101 being impregnated with the binder/crosslinking agent after being embossed is an example.

(Crosslinking Agent Supply Device)

The crosslinking agent supply device 8 is arranged downstream in the MD of the binder supply device 7.

The crosslinking agent supply device 8 is a device that sprays a crosslinking agent solution on the paper sheet 101, on which unevenness has been formed and the water-soluble binder solution has been supplied, to supply the crosslinking agent to the paper sheet 101.

It is preferable if the binder is a crosslinked binder because the physical strength of the paper sheet 101 is improved. The crosslinking agent, which crosslinks the binder, reacts with the binder to cause a crosslinking reaction, and causes a binder 37 to have a cross-linked structure, resulting in improvement of the physical strength.

In a case of using a binder having a carboxyl group such as carboxymethylcellulose, polyvalent metal ions are preferably used as the crosslinking agent. Examples of the polyvalent metal ions include alkaline earth metal ions such as zinc, calcium, and barium, and metal ions such as magnesium, aluminum, manganese, iron, cobalt, nickel, and copper.

Specifically, ions of zinc, calcium, barium, magnesium, aluminum, ion, cobalt, nickel, and copper are preferably used, which are preferable in terms of imparting sufficient wet strength. The above-described polyvalent metal ions as the crosslinking agent are used in the form of a water-soluble metal salt such as a sulfate, a chloride, a hydroxide, a carbonate, or a nitrate.

Furthermore, in a case of using polyvinyl alcohol as the binder, a titanium compound, a boron compound, a zirconium compound, or a compound containing silicon can be used as the crosslinking agent. One or a plurality of the aforementioned compounds can be mixed and used as the crosslinking agent.

Examples of the titanium compound include titanium lactate and titanium triethanol aminate, and examples of the boron compound include borax and boric acid.

Furthermore, examples of the zirconium compound include ammonium zirconium carbonate, and examples of the compound containing silicon include sodium silicate. The crosslinking agent reacts with the water-soluble binder to cause a crosslinking reaction, and causes the water-soluble binder to have a cross-linked structure, resulting in improvement of the physical strength. For example, a zinc sulfate aqueous solution is used.

The water-soluble binder is sprayed on the paper sheet 101 that has been embossed in a non-wet state, and thus can promptly permeate the paper sheet 101.

However, the crosslinking agent sprayed subsequently less easily permeates an inner layer of the paper sheet 101 already in a wet state. Therefore, a concentration gradient occurs in the paper sheet 101 in a thickness direction, and a relatively high concentration of the crosslinking agent remains near the surface.

Therefore, through the supply of the crosslinking agent to the paper sheet 101, a higher-density crosslinking reaction proceeds on a surface of the paper sheet 101, and the strength of a surface layer of the paper sheet 101 can be selectively increased. Furthermore, occurrence of paper powder at the time of use of the generated water-dispersible paper can be effectively prevented.

Note that both surfaces of the paper sheet 101 can be strengthened if the crosslinking agent is supplied to both sides of the paper sheet 101.

(Drying Device)

The drying device 9 that contactlessly dries the paper sheet 101 in a wet state is arranged downstream in the MD of the crosslinking agent supply device 8.

As the drying device 9, electromagnetic wave drying is preferable. However, the drying method is not limited thereto. Electromagnetic wave drying, through-flow drying (hot-air drying), infrared ray drying, or hot roller drying may be employed.

The electromagnetic wave drying has an advantage of taking less time to achieve drying. Furthermore, the electromagnetic wave has high penetrating ability, and thus can enter the inside of the paper sheet 101 to uniformly heat the paper sheet 101, thereby to uniformly dry the paper sheet 101.

Furthermore, in the electromagnetic wave drying, because the electromagnetic wave energy is directly loaded without secondary consumption of energy, the energy can be saved by at least 30% as compared with infrared ray heating.

The electromagnetic wave drying is free from the risk of squashing an unevenness form of an unevenness body 12 by embossing due to wind pressure, unlike the through-flow drying (hot-air drying), and is also free from the risk of squashing the unevenness form due to mechanical pressure, unlike the hot roller drying.

Furthermore, the electromagnetic wave drying is superior to the through-flow drying, the infrared ray drying, and the hot roller drying in drying efficiency, and can complete drying in a shorter time. Therefore, the electromagnetic wave drying is free from the risk of emboss reversion where a difference in elevation of the emboss is decreased.

Figure 6:
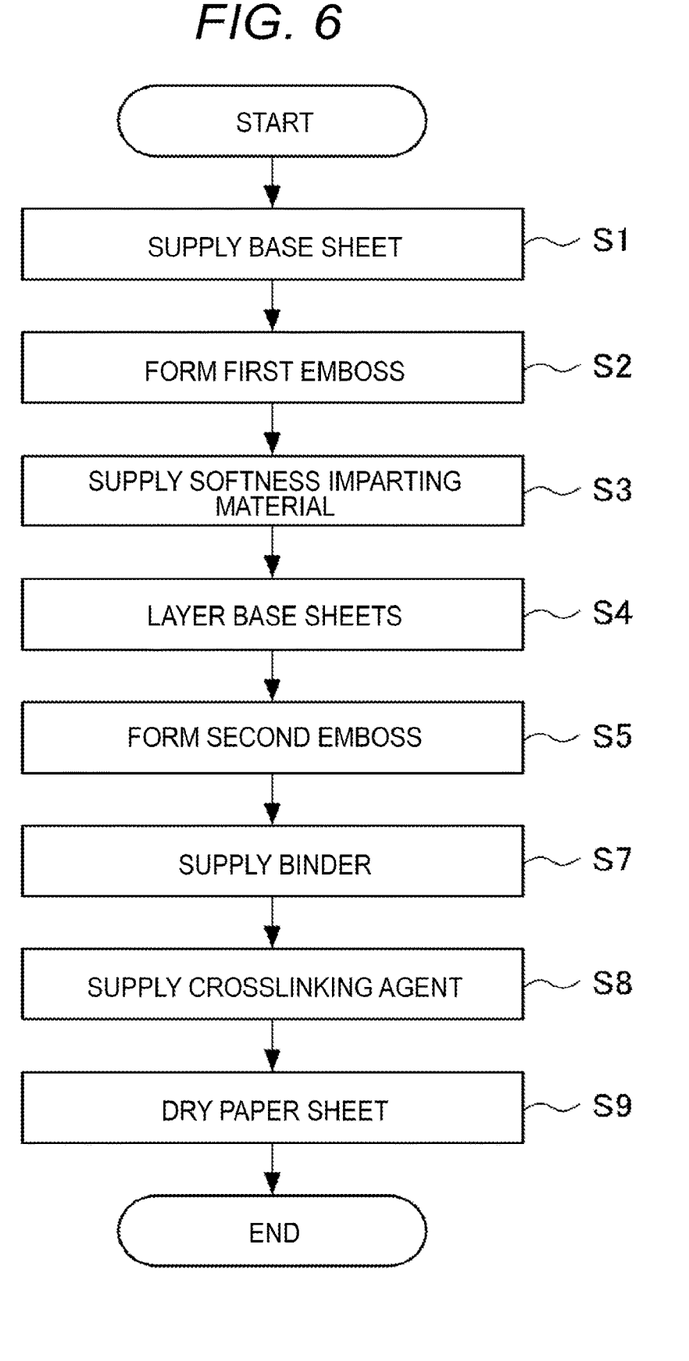
FIG. 6 is a flowchart for describing the manufacturing method of the present embodiment.

Next, the method of manufacturing the paper sheet 101 according to the present embodiment will be described. FIG. 6 is a flowchart for describing the manufacturing method of the present embodiment.

(Base Sheet Supply Step)

As illustrated in FIG. 1, the base sheet 1 wound around the supply roll 2 is continuously pulled out in the MD direction (step S1).

Note that, at this time, the base sheet 1 is in a non-wet state. The non-wet state does not include the mode in which moisture is applied to the base sheet 1 such as by blowing water on the base sheet 1.

In ordinary, paper materials include moisture (water content) corresponding to conditions of air temperature and humidity, but the moisture (water content) is not water content positively supplied from outside. Because of this, even if such moisture (water content) is included, this corresponds to the non-wet state according to the present embodiment.

Accordingly, the percentage content of moisture (water content) in the base sheet 1 varies depending on the conditions of air temperature and humidity, and even when the percentage content shows any numeric value, it can be understood that this corresponds to the non-wet state according to the present embodiment.

(First Emboss Forming Step)

The base sheet 1 supplied from the supply roll 2 is sent to between the first pressure rolls 3 and a first emboss in a direction (lateral direction) perpendicular to the MD direction is formed (step S2).

(Softness Imparting Material Supply Step)

The softness imparting material 41 is supplied from the softness imparting material supply device 4 onto the base sheet 1B, which is one of the two base sheets 1A and 1B (step S3).

(Layering Step)

The base sheet 1A, and the base sheet 1B on which the softness imparting material 41 has been placed are layered by the pinch roll 5, and the layered paper sheet 101 is further sent to the downstream in the MD (step S4).

(Second Emboss Forming Step)

An emboss is further formed on the paper sheet 101 by the second pressure roll 6 arranged downstream in the MD of the pinch roll 5 (step S4).

The second pressure roll 6 embosses the paper sheet 101 in the MD direction.

(Binder Supply Step)

Next, the water-soluble binder is sprayed on the surface of the paper sheet 101 on which the embosses have been formed, and the paper sheet 101 is impregnated with the water-soluble binder (step S7).

(Crosslinking Agent Supply Step)

Following that, the crosslinking agent is sprayed on the paper sheet 101. The crosslinking agent reacts with the water-soluble binder to cause a crosslinking reaction, and causes the water-soluble binder to have a cross-linked structure, resulting in improvement of the physical strength (step S8).

(Drying Step)

The paper sheet 101 in a wet state is contactlessly dried by irradiation with electromagnetic waves and/or far infrared rays in contactless drying (step S9).

(Effects)

(1) In the present embodiment, embossing is performed a plurality of times (twice in the present embodiment). Fiber embossed a plurality of times is extended, and is further deeply embossed.

If the base sheet 1 or the paper sheet 101 is deeply embossed from the first time, the sheet may be torn. Furthermore, the strength of the base sheet 1 or the paper sheet 101 may be decreased, and the thickness may be decreased due to the torn sheet.

However, in the present embodiment, embossing is performed a plurality of times. For this reason, there is no risk that the sheet is torn, for example, and the base sheet 1 or the paper sheet 101 can be further deeply embossed.

(2) Furthermore, in a case of deeply embossing the base sheet 1 or the paper sheet 101, conventionally, moisture is supplied to the base sheet. However, in the present embodiment, the embossing is performed a plurality of times, and thus embosses with a high bulkiness amount can be formed in a non-wet state without supplying moisture.

If papers are wet, a conveyance device is isolated and becomes a special line. However, the paper to be embossed in the present embodiment is used in a non-wet state. That is, a load in conveying the paper can be reduced and the manufacturing cost can also be decreased by the absence of a wet process. Note that, in a case of conveying the base sheet 1 by a conveying device (not illustrated), conveying speed may be reduced before passing through the rolls (3, 5, and 6). Accordingly, the base sheet 1 becomes a relaxed state from a tense state, and thus the pressing force by the rolls (3, 5, and 6) can more effectively act on the base sheet 1, and softness of the base sheet 1 can be further improved.

Furthermore, since embossing is not applied in a wet state, there is no risk that the base sheet 1 adheres to the first pressure roll 3. Therefore, supply of a release agent to the first pressure roll 3 and to the base sheet 1 is not necessary.

(3) As described above, when the base sheet 1 or the paper sheet 101 is extended, the degree of freedom of the space formed by the fibers is increased, and texture of the paper sheet 101 can be improved.

(4) In the present embodiment, by adjusting the emboss depth of embossing a plurality of times, the texture of the paper, filth wiping properties (emboss height), and the strength can be achieved at the same time.

(5) The softness imparting material 41 has a space therein. With this space, the softness imparting material 41 has high bulkiness. Accordingly, softness of the paper sheet 1 as an end product can be improved.

Second Embodiment

Figure 7:
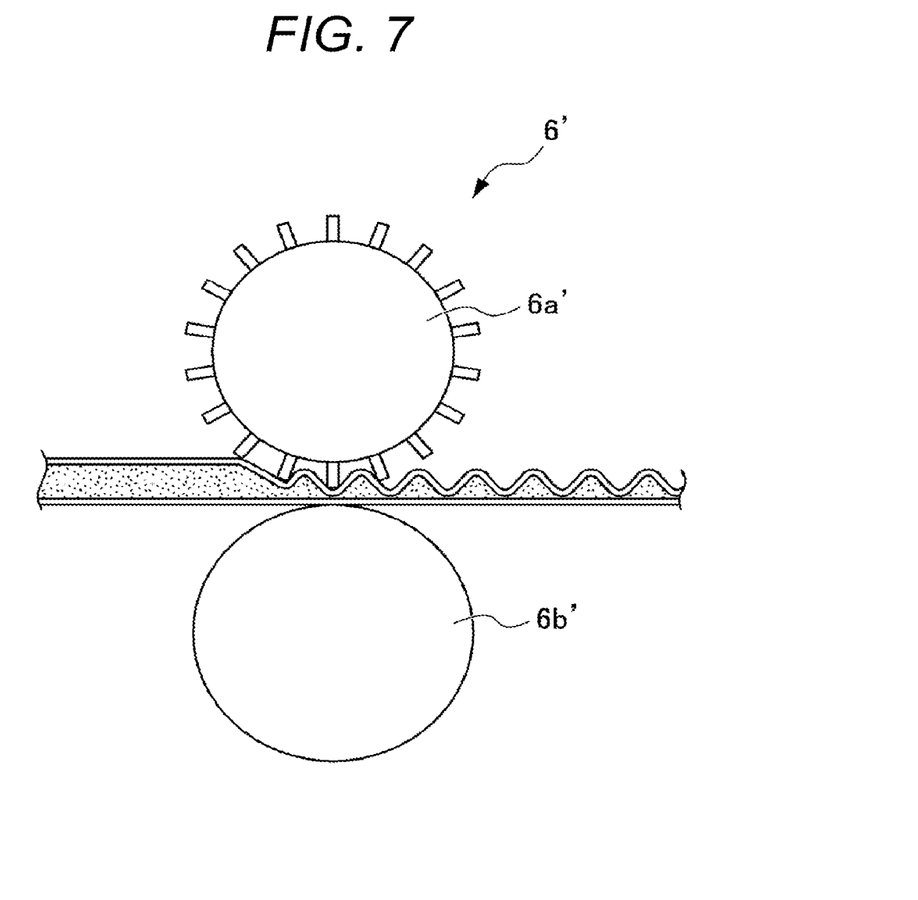
FIG. 7 is a view illustrating second pressure rolls of a second embodiment.

Next, a second embodiment will be described. FIG. 7 is a view illustrating a second pressure roll 6' of the second embodiment. The second embodiment is different from the first embodiment in that one of a pair of rolls 6a' and 6b' in the second pressure roll 6' (the roll 6b' in the present embodiment) is a flat roll, instead of an emboss roll.

Note that FIG. 2 of the first embodiment illustrates the raised portion with a triangular cross section of the first pressure roll 3 and the second pressure roll 6. However, in the second embodiment illustrated in FIG. 7, a raised portion with a rectangular cross section formed on the pressure roll 6' is illustrated. Note that the shape of the raised portion is not limited thereto, and any shape can be employed.

Other configurations are similar to those of the first embodiment, and thus description of similar portions is omitted.

Effects of Present Embodiment

According to the present embodiment, the following effects are exhibited, in addition to the effects of the first embodiment.

In a case where unevenness is formed in both of the pair of rolls 6a and 6b in the second pressure roll 6, like the first embodiment, the recessed portion and the raised portion are meshed with each other, and the base sheet 1 or the paper sheet 101 is entirely pressed from both the front and back sides. In this case, an effect of softening by hands can be obtained through a plurality of times of pressing.

However, in order not to impair softness of the sheet itself in the thickness direction, a lesser number of places are preferably pressed from both sides.

In the present embodiment, one of the pair of rolls 6a' and 6b' is the flat roll 6b, instead of an emboss roll, and thus there are places on the sheet not pressed by the raised portion. Therefore, less entanglement of fibers occurs, and a sheet with higher softness can be provided.

Especially, in a case of a water-dispersible paper, the sheet may become less water-dispersible due to close contact of fibers when the sheet is pressed. However, the pressure roll 6' of the present embodiment does not hinder water-dispersibility.

Third Embodiment

Figure 8:
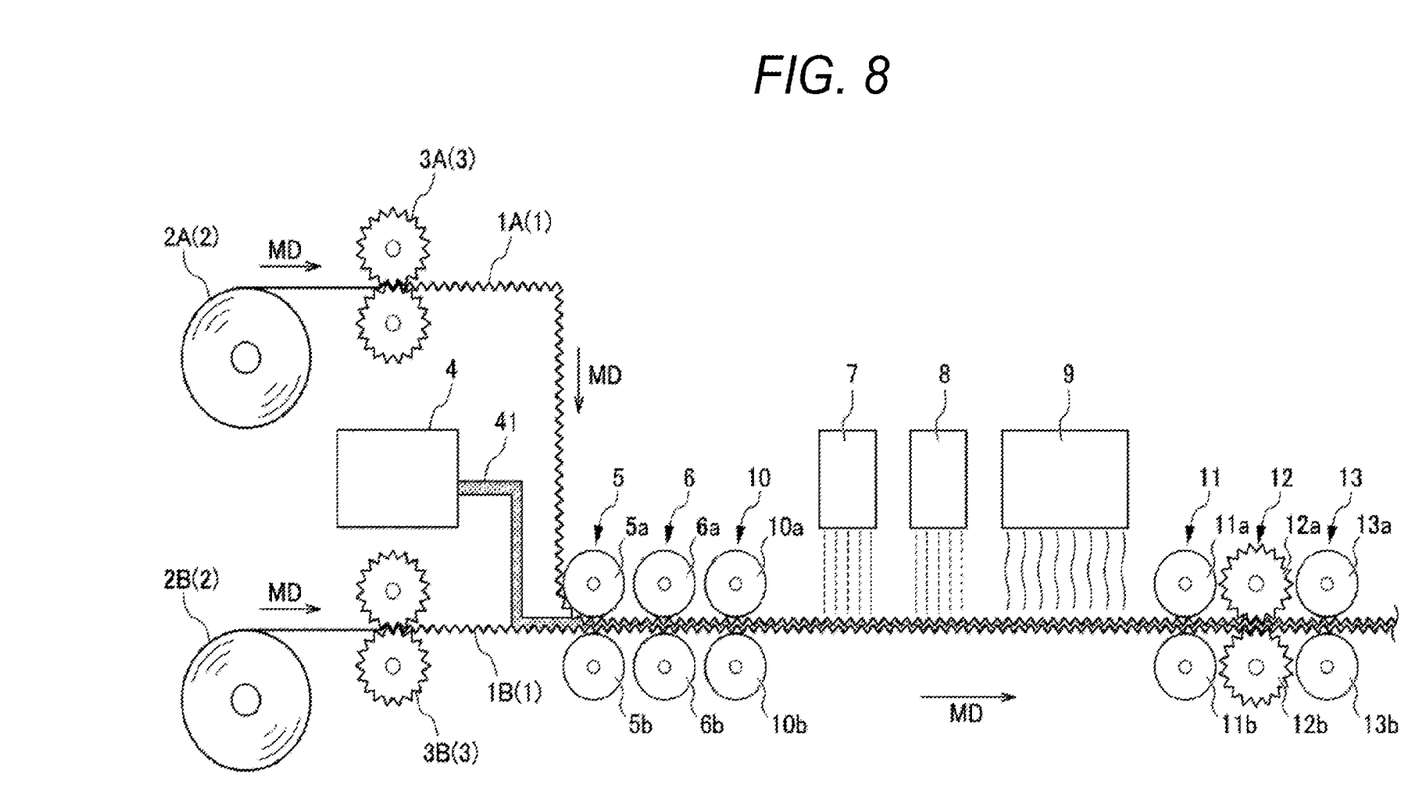
FIG. 8 is a diagram illustrating a method of manufacturing a paper sheet of a third embodiment.

Next, a third embodiment will be described. FIG. 8 is a diagram illustrating a method of manufacturing a paper sheet 101 of the present embodiment.

The third embodiment is different from the first embodiment in that a third pressure roll 10 is arranged between a second pressure roll 6 and a binder supply device 7, and a fourth pressure roll 11, a fifth pressure roll 12, and a sixth pressure roll 13 are arranged after a drying device 9.

A pair of rolls 10a and 10b in the third pressure roll 10 is rolls having a smooth outer peripheral surface.

A pair of rolls 11a and 11b in the fourth pressure roll 11 is rolls for embossing the paper sheet 101 in a longitudinal direction, similar to the second pressure roll 6.

A pair of rolls 12a and 12b in the fifth pressure roll 12 is rolls for providing unevenness to the paper sheet 101 in a lateral direction, similar to the second pressure roll 6.

Note that the order of the fourth pressure roll 11 and the fifth pressure roll 12 may be reversed.

A pair of rolls 13a and 13b in the sixth pressure roll 13 is rolls having a smooth outer peripheral surface, similar to the third pressure roll 10.

Figure 9:
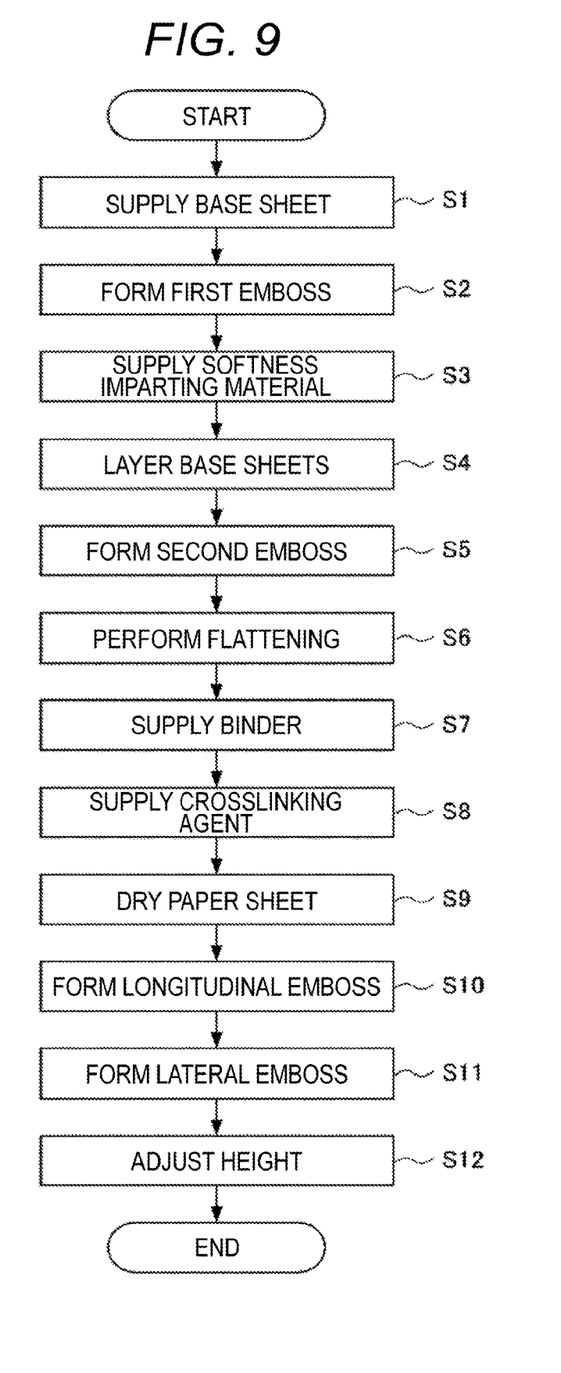
FIG. 9 is a flowchart for describing the manufacturing method of the third embodiment.

A manufacturing method according to the present embodiment is illustrated in the flowchart of FIG. 9. The flowchart of FIG. 9 includes, between steps S4 and S5 of the flowchart of FIG. 6, flattening step S6 of once squashing an emboss shape formed by a first pressure roll 3 and the second pressure roll 6, by the second pressure roll 6.

Furthermore, step S10 of forming a longitudinal emboss, step S11 of forming a lateral emboss, and step S12 of further performing flattening are conducted for a hardened paper sheet 1, after a drying step.

Effects of Present Embodiment (1) According to the present embodiment, the following effects are exhibited, in addition to the effects of the first embodiment.

Before supplying a binder in step S7, the emboss height of the paper sheet 1 can be changed by the third pressure roll 10 as a flat roll.

If the paper sheet 1 has too large an emboss height or has variations in height, nonuniformity may occur in a supply state of a binder or a crosslinking agent. As a result, a place having a small amount of binder or crosslinking agent cannot have a cross-linked structure, and the strength of a fibrous sheet becomes weak therein.

However, the third pressure roll 10 formed of the pair of flat rolls is arranged between the second pressure roll 6 and the binder supply device 7, and the emboss height of the paper sheet 101 can be adjusted by the flat rolls.

As a result, the emboss height of the paper sheet 101 can be adjusted and made constant. Therefore, nonuniformity is less likely to occur in the supply states of the binder and the crosslinking agent, and the strength (tensile strength) of the fibrous sheet can be improved. Note that the nonuniformity in the supply state refers to nonuniformity caused due to insufficient supply of a liquid in the latter steps in the MD.

(2) A surface of the paper sheet 101 hardened in binder supply step S7, crosslinking agent supply step S8, and drying step 9 can be made soft by the fourth pressure roll 11 and the fifth pressure roll 12 arranged downstream of the drying device 9.

That is, embossing is further performed a plurality of times after hardening, whereby an effect obtained in a case of performing softening by hands can be obtained. Accordingly, the embossed places can have good texture (softness) and become soft.

(3) Furthermore, a final height dimension of the paper sheet 101 can be changed by the sixth pressure roll 13 formed of the pair of flat rolls. Accordingly, filth wiping properties can be adjusted depending on use of the product.

Conventionally, change of the emboss height of the paper sheet 1 requires reproduction of an emboss roll having a predetermined height. Therefore, cost and time are required due to achievement of accuracy of meshing of the emboss rolls and manufacturing time for engraving.

However, according to the present embodiment, adjustment of the emboss height is easy, and thus a substantial decrease in the manufacturing cost can be realized.

(4) Furthermore, the paper sheet 101 is squashed by the sixth pressure roll 13 formed of the pair of flat rolls. Therefore, the squashed place serves as room for extension, and room for extension is generated in the fibrous sheet.

As a result, when the fibrous sheet is pressed, the pressing force can be relieved by the room for extension (damper effect (buffer effect)), resulting in obtainment of softness (texture).

(5) A paper with suppressed bulkiness while maintaining texture, can be obtained when the finished paper sheet 101 is wound around a reel. As a result, storage and transportation can be easy. Storage and transportation in storing the present product can be easy.

(6) For example, in a case of a process including twice of emboss processing including a primary emboss process and a secondary emboss process, and a binder supply and drying process, larger extension of fiber can be obtained in a case of processing the paper sheet 101 in the order of the primary emboss process, the binder supply and drying process, and the secondary emboss process (that is, embossing is again provided after the fibers are extended and the shape is fixed) than a case of processing the paper sheet 101 in the order of the primary emboss process, the secondary emboss process, and the binder supply and drying process. The present embodiment is the former case, and thus can further extend the fiber.

(7) Although the fiber can be extended by providing an emboss and softness can be obtained, the extension may affect an aspect ratio of the paper.

In the present embodiment, the embossing is sequentially performed in the longitudinal direction (conveying direction) and the lateral direction (the direction perpendicular to the conveying direction), after the binder supply and drying process, whereby softness of the paper can be obtained without affecting the aspect ratio of the paper.

The above-described embodiments and modifications can be appropriately combined and used. However, detailed description is omitted. Furthermore, the present invention is not limited to the above-described embodiments. As an example, the base sheet 1A may be omitted, and the paper sheet 101 may be manufactured from the base sheet 1B and the softness imparting material 41.

REFERENCE SIGNS LIST

1 Base sheet
2 Supply roll
3 First pressure roll
4 Softness imparting material supply device
5 Pinch roll
6 Second pressure roll
7 Binder supply device
8 Crosslinking agent supply device
9 Drying device
10 Third pressure roll
11 Fourth pressure roll
12 Fifth pressure roll
13 Sixth pressure roll
41 Softness imparting material
101 Paper sheet

The invention claimed is:

1. A method of manufacturing a paper sheet, comprising:
supplying a continuous base sheet;
applying, to a surface of the base sheet, first pressing force in a direction normal to the surface; and
applying, to the surface of the base sheet, second pressing force in the direction normal to the surface,
wherein the supplying of the continuous base sheet comprises supplying a first base sheet and a second base sheet from different directions, and
the method further comprises
supplying a softness imparting material between the first base sheet and the second base sheet, and
supplying a binder to a layered body of the first base sheet, the second base sheet, and the softness imparting material.

2. The method according to claim 1, wherein
the first pressing force, the second pressing force, or both is applied by interposing the base sheet between two members facing each other to press the base sheet.

3. The method according to claim 2, wherein
at least one of the two members has a flat surface facing the other member.

4. The method according to claim 2, wherein
at least one of the two members has a surface having a raised portion and facing the other member.

5. The method according to claim 2, wherein
the two members have a surface having a same shape.

6. The method according to claim 5, wherein
the applying of the first pressing force and the applying of the second pressing force are performed when the base sheet is dry.

7. The method according to claim 2, wherein
the two members have a surface having different shapes.

8. The method according to claim 7, wherein
the applying of the first pressing force and the applying of the second pressing force are performed when the base sheet is dry.

9. The method according to claim 2, wherein
the applying of the first pressing force and the applying of the second pressing force are performed when the base sheet is dry.

10. The method according to claim 2, further comprising: heating the base sheet.

11. The method according to claim 2, further comprising: drying the layered body after the supplying of the binder.

12. The method according to claim 1, wherein
the applying of the first pressing force and the applying of the second pressing force are performed when the base sheet is dry.

13. The method according to claim 1,
wherein in the supplying of the softness imparting material, the softness imparting material is supplied from an upper side of the second base sheet, and
the method further comprises adsorbing the softness imparting material from a lower side of the second base sheet.

14. The method according to claim 1, further comprising: heating the base sheet.

15. The method according to claim 1, wherein
the applying of the first pressing force is performed such that a first embossing pattern is formed on the surface, and
the applying of the second pressing force is performed such that a second embossing pattern different from the first embossing pattern is formed on the surface.

16. The method according to claim 15, wherein the applying of the first pressing force and the applying of the second pressing force are performed when the base sheet is dry.

17. The method according to claim 1, further comprising: drying the layered body after the supplying of the binder.

18. The method according to claim 17, wherein
at least one of the applying of the first pressing force and the applying of the second pressing force is performed after the drying.

19. The method according to claim 18, wherein
the applying of the first pressing force comprises forming a raised portion and a recessed portion in the base sheet in a direction extending in a longitudinal direction thereof; and
the applying of the second pressing force comprises forming a raised portion and a recessed portion in the base sheet in a direction extending in a short-side direction thereof.

* * * * *